US008207817B2

(12) United States Patent
Kamiya

(10) Patent No.: US 8,207,817 B2
(45) Date of Patent: Jun. 26, 2012

(54) ELECTRONIC KEY SYSTEM

(75) Inventor: Masachika Kamiya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1266 days.

(21) Appl. No.: 11/434,873

(22) Filed: May 17, 2006

(65) Prior Publication Data

US 2006/0290466 A1 Dec. 28, 2006

(30) Foreign Application Priority Data

Jun. 14, 2005 (JP) ................................ 2005-174348

(51) Int. Cl.
*G05B 19/00* (2006.01)

(52) U.S. Cl. ........................................................ 340/5.7

(58) Field of Classification Search .................. 340/5.7, 340/5.23, 5.1, 3.1; 70/263
See application file for complete search history.

(56) References Cited

U.S. PATENT DOCUMENTS 5,506,575 A * 4/1996 Ormos ......................... 340/5.23
5,508,691 A * 4/1996 Castleman et al. .......... 340/5.24
5,540,069 A * 7/1996 Muller et al. ................ 70/278.2
6,073,064 A * 6/2000 Konrad et al. .................. 701/36
6,094,721 A 7/2000 Eldridge et al.
6,160,488 A * 12/2000 Honda ......................... 340/5.65
6,377,173 B1 4/2002 Desai
6,600,406 B1 * 7/2003 Ha ................................ 340/5.2
2002/0061108 A1 5/2002 Shinohara
2003/0021418 A1 1/2003 Arakawa et al.
2004/0159135 A1 8/2004 Kato et al.
2004/0162980 A1 8/2004 Lesenne et al.

FOREIGN PATENT DOCUMENTS

CN 1350611 A 5/2002
DE 197 35 658 C1 7/1998
DE 198 12 210 C1 5/1999
EP 0 835 790 A2 4/1998
EP 1 081 001 A2 3/2001
JP 8-150899 6/1996
JP 8-218699 8/1996
JP 9-119246 5/1997
JP 10-175512 6/1998
JP 2002-544415 12/2002
WO WO 00/68536 11/2000

* cited by examiner

*Primary Examiner* — Vernal Brown
(74) *Attorney, Agent, or Firm* — Oblon, Spivak, McClelland, Maier & Neustadt, L.L.P.

(57) ABSTRACT

An electronic key system which checks, using two-way communication, a key code stored in an electronic key against a key code stored in a lock device that locks an entrance to a predetermined space, and allows an unlocking operation of the lock device if the key code stored in the electronic key matches the key code stored in the lock device, is such that the key code includes an identification code unique to the electronic key and a property code indicative of a property of the electronic key (a master key or an additional key). The lock device erases a key code that includes a property code indicating that the key is an additional key, from among the key codes stored in the lock device, when a predetermined operation (including an operation using the master key) is performed.

16 Claims, 4 Drawing Sheets

ELECTRONIC KEY SYSTEM

INCORPORATION BY REFERENCE

The disclosure of Japanese Patent Application No. 2005-174348 filed on Jun. 14, 2005, including the specification, drawings and abstract is incorporated herein by reference in its entirety.

BACKGROUND OF THE INVENTION

1. Field of the Invention

The invention relates to an electronic key system which checks a key code stored in a lock device that locks an entrance into a predetermined space against a key code stored in an electronic key using two-way communication, and allows an unlocking operation of the lock device if the two codes match. More particularly, the invention relates to an electronic key system that enables only the key code(s) of an additional key(s), from among the registered key codes, to be batch erased.

2. Description of the Related Art

Japanese Patent Application Publication No. JP-A-8-150899, for example, discloses an immobilizer system which is one related security system for a vehicle. This immobilizer system checks the key against a key code using two-way communication with the vehicle, and allows the engine to start only if the key code matches. Vehicles in Europe have been required to be provided with this immobilizer system as standard equipment since 1997, and there is an increasing trend to use them in vehicles in Japan as well.

Japanese Patent Application Publication No. JP-A-2004-314806, for example, discloses a smart start system which is another related technology that has appeared in recent years. This smart start system checks an electronic key against a key code using two-way communication with the vehicle. If the key code matches, the engine is allowed to be started/stopped simply by the push of a push button-type ignition switch as long as the electronic key is somewhere on the user's person, i.e., the engine can be started/stopped without the user having to take the electronic key out of a clothes pocket or the like.

Similarly, Japanese Patent Application Publication No. JP-A-2005-127050 also discloses a smart entry system which checks an electronic key against a key code using two-way communication with the vehicle. If the key code matches, the door lock is unlocked and the door able to be opened by the user simply grabbing (touching) the outside door handle as long as the electronic key is somewhere on the user's person, i.e., the door can be unlocked without the user having to take the electronic key out of a clothes pocket or the like.

A system which integrates these two technologies is referred to, for example, as a smart entry & push button engine start system and is already offered in some vehicles on the market today. With this smart entry & push button engine start system, the key only needs to transmit a key code to the vehicle using two-way communication, as described above, which means the key does not necessarily have to be a mechanical key. Therefore, the key can be incorporated into a mobile phone, a wristwatch or other item usually carried by the user.

Thus, it is conceivable that, in addition to the electronic key (the master key) with a registered key code that was handed over to the user by the manufacturer at the time the vehicle was purchased, the user may also purchase an aftermarket electronic key which is integrated into, for example, a mobile phone or a wristwatch, as described above, to increase mobility and enhance fashion. The key code of that electronic key may be newly registered with the vehicle and the item then used as an additional key.

According to the apparatus disclosed in Japanese Patent Application Publication No. JP-A-8-150899 described above, however, if the driver loses a key, then all of the registered key codes, including that of the lost key, are erased so the key codes of any keys that the driver has at hand must be re-registered.

When this method is applied to recent smart entry & push button engine start systems such as that described above, problems can arise when, for example, the vehicle is sold as a used vehicle to another person.

That is, when a key that is integrated with a mobile phone or a wristwatch is used as an additional key, for example, it is unlikely that a new user that purchased the vehicle as a used vehicle will also receive that mobile phone or wristwatch from previous user. As a result, the vehicle will be transferred from the previous user to the new user while the key codes of these additional keys registered with the vehicle are still valid.

Thus, even after the vehicle is sold, it is still possible for the previous user to open a door of the vehicle that is no longer his or hers and start the engine using the additional key that he or she still has, which is of course undesirable. Because a general user is unable to check the registered key codes, however, a new user is unable to know if any additional keys have been registered unless he or she goes to a specialty store such as a dealer and has a specialist there check the key codes registered with the vehicle.

If an additional key(s) that is registered with the vehicle has not been handed over to the new user, the new user must first have all of the registered key codes erased by the specialist and then have the key at hand registered again.

This kind of inconvenience occurs because, with the method disclosed in Japanese Patent Application Publication No. JP-A-8-150899 described above, it is impossible to identify whether the key code registered with the vehicle is the key code for the master key that has been registered in advance by a vehicle production worker at the time of shipping of the vehicle or a key code for an additional key that was registered after the vehicle was shipped.

In addition, houses which employ a smart entry system such as that described above for the front door are also now appearing. In this case, as well, the same kind of inconvenience when erasing an additional key(s) can also occur.

SUMMARY OF THE INVENTION

In view of the foregoing problems, this invention thus provides an electronic key system that enables the key code of a master key and the key code of an additional key to be identified, such that only the key code(s) of an additional key(s), from among registered key codes, can be batch erased at times such as when a vehicle is resold.

A first aspect of the invention relates to an electronic key system which checks, using two-way communication, a key code stored in an electronic key against a key code stored in a lock device that locks an entrance (such as a front door or a vehicle door) to a predetermined space (such as an area of a house or building, or a space inside a vehicle cabin), and allows an unlocking operation of the lock device if the key code stored in the electronic key matches the key code stored in the lock device, wherein the key code includes an identification code unique to the electronic key and a property code indicative of a property of the electronic key.

In this first aspect, the property of the electronic key may indicate whether the electronic key is a master key that was registered in advance or an additional key that was newly registered in the aftermarket.

This first aspect thus makes it possible to identify whether the key code stored in the lock device is for a master key or for an additional key.

Accordingly, for example, by structuring the lock device to erase a key code that includes a predetermined property code (such as a property code indicative of an additional key), from among the key codes stored in the lock device, when a predetermined operation (preferably including an operation using the master key) is performed, it is possible to batch erase only the additional key.

In the first aspect, the lock device preferably includes a notifying device (notifying means) that checks whether a key code that includes a predetermined property code (such as a property code indicative of an additional key) is stored in the lock device and notifies (with a buzzer sound or textual information, for example) a user if the key code that includes the predetermined property code is stored in the lock device.

A second aspect of the invention relates to an electronic key system which checks, using two-way communication, a key code stored in an electronic key against a key code stored in an onboard apparatus mounted in a vehicle, and performs or allows a predetermined vehicle operation (such as opening a door or starting the engine) if the key code stored in the electronic key matches the key code stored in the onboard apparatus, wherein the key code includes an identification code unique to the electronic key and a property code indicative of a property of the electronic key.

In this second aspect, the property of the electronic key may indicate whether the electronic key is a master key that was registered in advance by a vehicle production worker at the time the vehicle was shipped or an additional key that was newly registered after the vehicle was shipped.

This second aspect thus makes it possible to identify whether the key code stored in the onboard apparatus is for a master key or for an additional key.

Accordingly, for example, by structuring the onboard apparatus to erase a key code that includes a predetermined property code (such as a property code indicative of an additional key), from among the key codes stored in the onboard apparatus, when a predetermined operation (preferably including an operation using the master key) is performed, it is possible to batch erase only the additional key.

In the second aspect, the onboard device preferably includes a notifying device (notifying means) that checks whether a key code that includes a predetermined property code (such as a property code indicative of an additional key) is stored in the onboard device and notifies (with a buzzer sound or textual information, for example) a user if the key code that includes the predetermined property code is stored in the onboard device when the onboard apparatus is started up.

Thus, the invention is able to provide an electronic key system that makes it possible to identify between a key code of a master key and a key code of an additional key and batch erase only the key code(s) of the additional key(s) from among registered key codes.

DETAILED DESCRIPTION OF THE PREFERRED EMBODIMENTS

The invention will hereinafter be described in more detail in terms of example embodiments with reference to the accompanying drawings. In the following example embodiments, a smart entry & push button engine start system of a vehicle will be given as one example of an electronic key system according to the invention. The basic concept, main hardware structure, operating principles, and basic control method and the like of the smart entry & push button engine start system are already known to one skilled in the art so a detailed description thereof will be omitted here.

The structure and operation of the electronic key system according to the example embodiment of the invention will hereinafter be described with reference to FIGS. 1 to 4.

Figure 1:
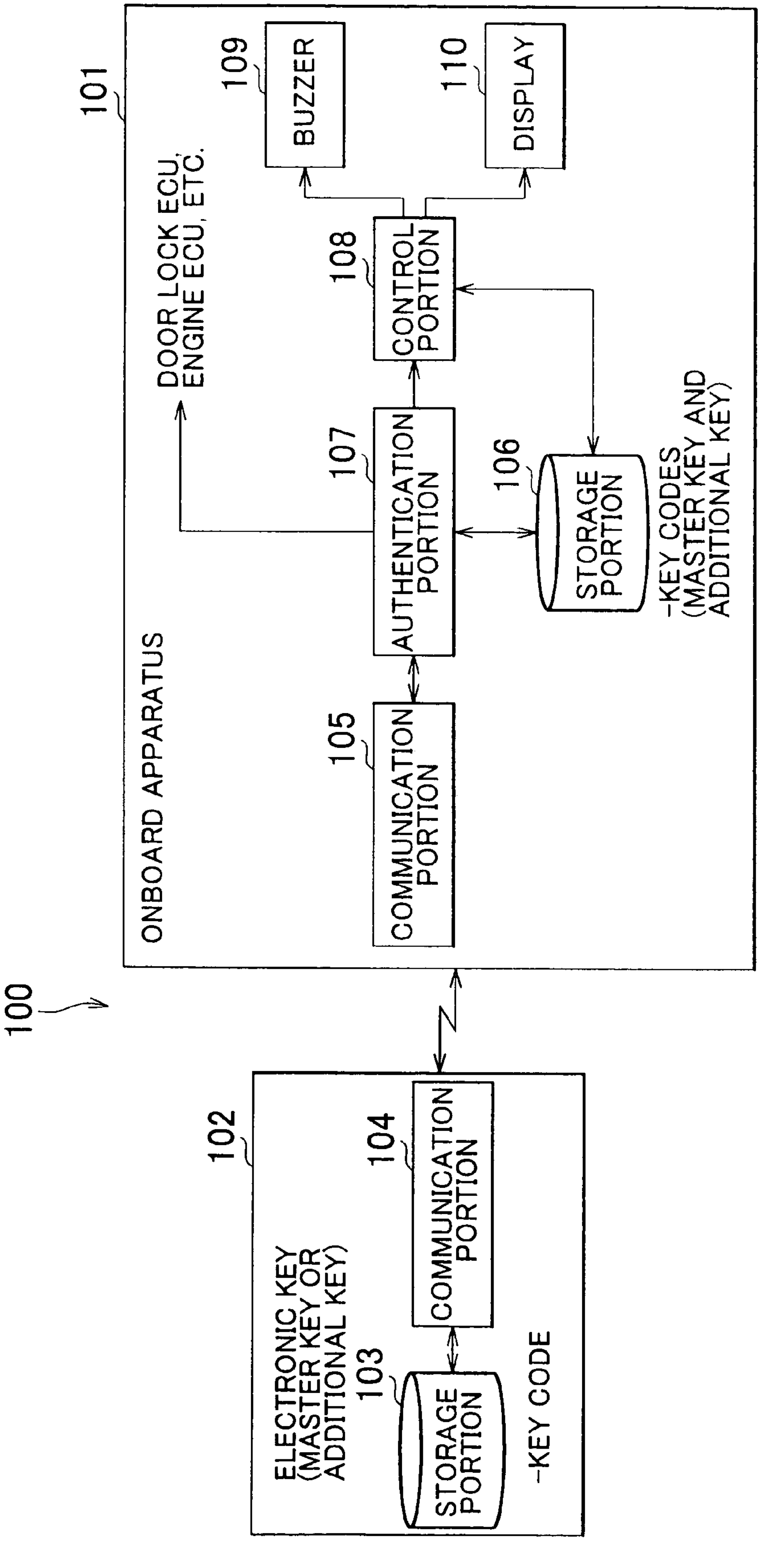
FIG. 1 is a block diagram schematically showing an electronic key system according to one example embodiment of the invention.

FIG. 1 is a block diagram schematically showing an electronic key system 100 according to this example embodiment. The electronic key system 100 includes an onboard apparatus 101 mounted in a vehicle and an electronic key 102 carried by a user.

As described above, the electronic key 102 may be a simple single mobile device or incorporated into another item that is carried around such as a mobile phone or a wristwatch. Also as described above, the electronic key 102 can be classified as a master key that was registered in advance by a vehicle production worker at the time the vehicle was shipped or as an additional key that was newly registered after the vehicle was shipped.

The electronic key 102 has a storage portion 103 which stores a key code unique to the electronic key 102, and a communication portion 104 which performs two-way communication with the onboard apparatus 101.

Here, the structure of the key code used in the electronic key system 100 according to this example embodiment will be described with reference to FIGS. 2A and 2B. The key code used in the existing smart entry & push button engine start system simply contains a unique identification (ID) code for identifying the electronic key, as shown in FIG. 2A.

Figures 2A, 2B:
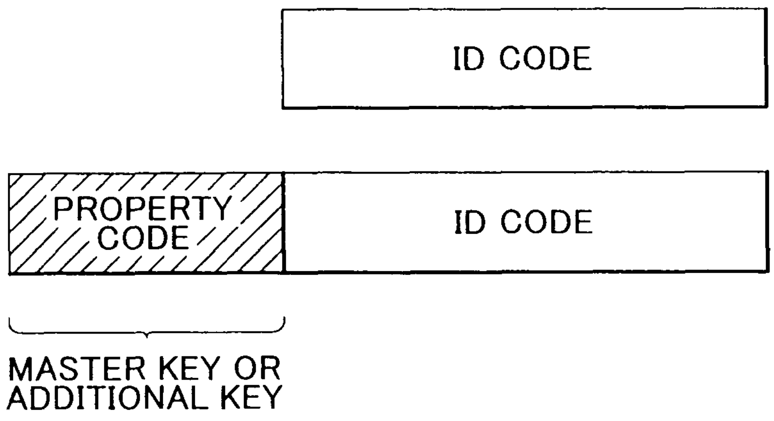
FIGS. 2A and 2B are schematic diagrams showing the structure of a key code that is checked in a related system and a key code that is checked in the electronic key system according to the example embodiment of the invention.

With the electronic key system 100 according to this example embodiment, however, a property code indicating whether the electronic key indicated by the key code is the master key or an additional key is added on to the beginning (or the end) of the key code, as shown in FIG. 2B, in order to make it possible to distinguish between the master key and the additional key.

That is, when a vehicle production worker registers the key code of the master key with the vehicle beforehand at the plant, a property code indicating that the key is the master key is added to the ID code specific to that electronic key 102 and then stored in the electronic key 102 and the onboard apparatus 101.

On the other hand, when a new electronic key 102 is registered as an additional key with the vehicle after the vehicle is shipped from the plant, a property code indicating that the key is an additional key is added to the ID code specific to that electronic key 102 and then stored in the electronic key 102 and the onboard apparatus 101.

Returning to the description of FIG. 1, a key code of this kind of structure is stored in the storage portion 103 of the electronic key 102. When the onboard apparatus 101 receives a request signal transmitted within a predetermined detection area, the communication portion 104 extracts the local key code from the storage portion 103 and sends it to the onboard apparatus 101.

Meanwhile, the onboard apparatus 101 has a communication portion 105 which sends a request signal intermittently, for example, into the predetermined detection area, as well as receives the key code of the electronic key 102 sent in response to this request signal.

The onboard apparatus 101 also includes a storage portion 106 which stores the key codes of the electronic keys 102 (i.e., the master key and additional keys) registered with the vehicle, i.e., valid key codes. As described above, each of the key codes stored in the storage portion 106 includes a property code which makes it possible to identify whether the key code is a key code of the master key or a key code of an additional key.

The onboard apparatus 101 further includes an authentication portion 107 which determines whether the key code of the electronic key 102 received by the communication portion 105 matches one of the key codes stored in the storage portion 106.

When the key code (=the property code+the ID code) of the electronic key 102 received by the communication portion 105 matches one of the key codes (=the property code+the ID code) stored in the storage portion 106, that is, when one entire key code, i.e., both the property code and the ID code, matches another entire key code, the authentication portion 107 authenticates the electronic key 102 as being a valid electronic key 102.

The authentication results are then sent to, for example, a door lock ECU, an engine ECU and the like, not shown, and used to realize the smart entry & push button engine start system.

For example, when the door lock ECU receives information indicating that a valid electronic key 102 has been detected, the door lock is unlocked for a predetermined period of time by the user (grabbing) touching the outside door handle. Also, for example, when the engine ECU receives information indicating that a valid electronic key 102 has been detected, the engine is placed in a state in which it can be started or stopped by the user pushing a push button-type ignition switch, not shown.

The onboard apparatus 101 also includes a control portion 108 which both functions to both comprehensively control each portion of the structural elements of the onboard apparatus 101 and rewrite the content stored in the storage portion 106.

In this example embodiment, when the user performs an additional key batch erase operation, the control portion 108 erases only the key code of the additional key, from the key codes stored in the storage portion 106, based on the property code.

Also in this example embodiment, when the onboard apparatus 101 is reset, the control portion 108 checks whether a key code(s) of an additional key(s) is stored in the storage portion 106 based on the property codes, and if so, notifies the user.

As one example of a structural element for realizing user notification of the existence of an additional key, the onboard apparatus 101 according to this example embodiment has a buzzer device 109 and a display unit 110. Both the buzzer device 109 and the display unit 110 may be either dedicated or used in combination with another onboard system. From the viewpoint of driver convenience, the display unit 110 is preferably also used as a display of a navigation system.

Figure 3:
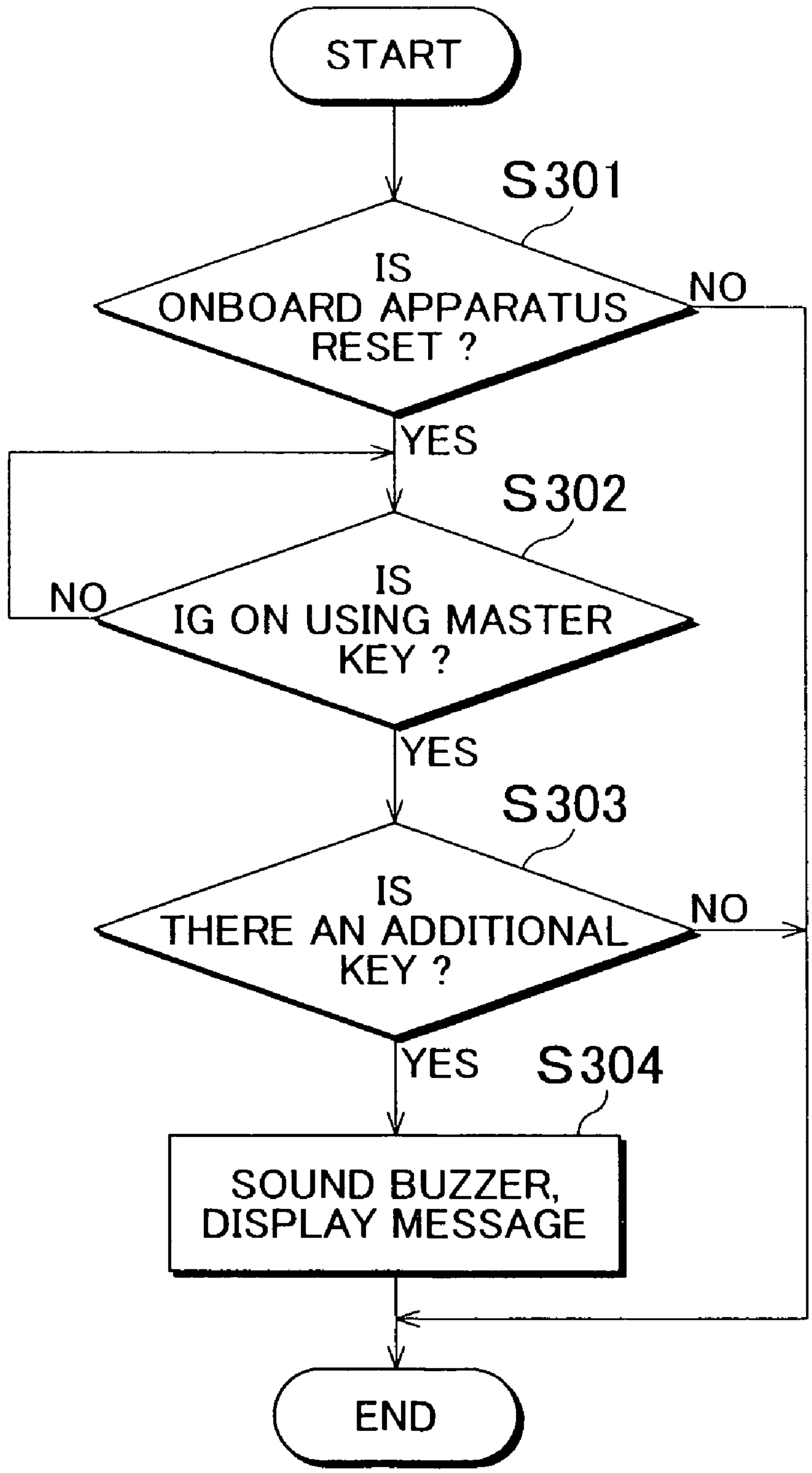
FIG. 3 is a flowchart illustrating the flow of an additional key check routine by the electronic key system according to the example embodiment of the invention.

With respect to the electronic key system 100 according to this example embodiment having a structure such as that described above, the routine for checking whether an additional key exists and notifying the driver if one does, as described above, will now be described with reference to FIG. 3. FIG. 3 is a flowchart illustrating the flow of an additional key check and notification routine executed by the electronic key system 100 according to this example embodiment.

In this routine, it is first determined whether the onboard apparatus 101 has been reset by, for example, the battery being reconnected (step S301). If the onboard apparatus 101 has not been reset (i.e., NO in step S301), the routine ends.

If, on the other hand, the onboard apparatus 101 has been reset (i.e., YES in step S301), it is next determined whether the ignition (IG) is turned on by the master key (step S302). If the IG is turned on by the master key (i.e., YES in step S302), then the control portion 108 of the onboard apparatus 101 determines whether any of the key codes stored in the storage portion 106 are key codes for additional keys based on the property codes included in the key codes (step S303).

If a key code for an additional key is registered (i.e., YES in step S303), the control portion 108 then controls the buzzer device 109 to sound a buzzer in a predetermined pattern and displays textual information, such as a message reading, "ADDITIONAL KEY REGISTERED!", on the display unit 110 notifying the driver that an additional key exists (step S304).

As is evident to one skilled in the art, instead of, or in addition to, sounding a buzzer and displaying textual information, a voiced message may also be issued.

If, on the other hand, no key code for an additional key is registered, i.e., if only the key code for the master key is registered (i.e., NO in step S303), then the notification process in step S304 is not carried out.

This kind of check and notification routine enables a user that has newly obtained ownership of a used vehicle, for example, to know whether any additional keys, other than the master key, are registered with the vehicle simply by resetting the onboard apparatus 101, i.e., without having to go to a specialty store such as a dealer.

Further, if a new user which has purchased a used vehicle, for example, becomes aware through this kind of check and notification routine that there are additional keys that the user has not received, the example embodiment enables the key codes of those additional keys to be erased and thus invalidated by an additional key batch erase routine described below.

Figure 4:
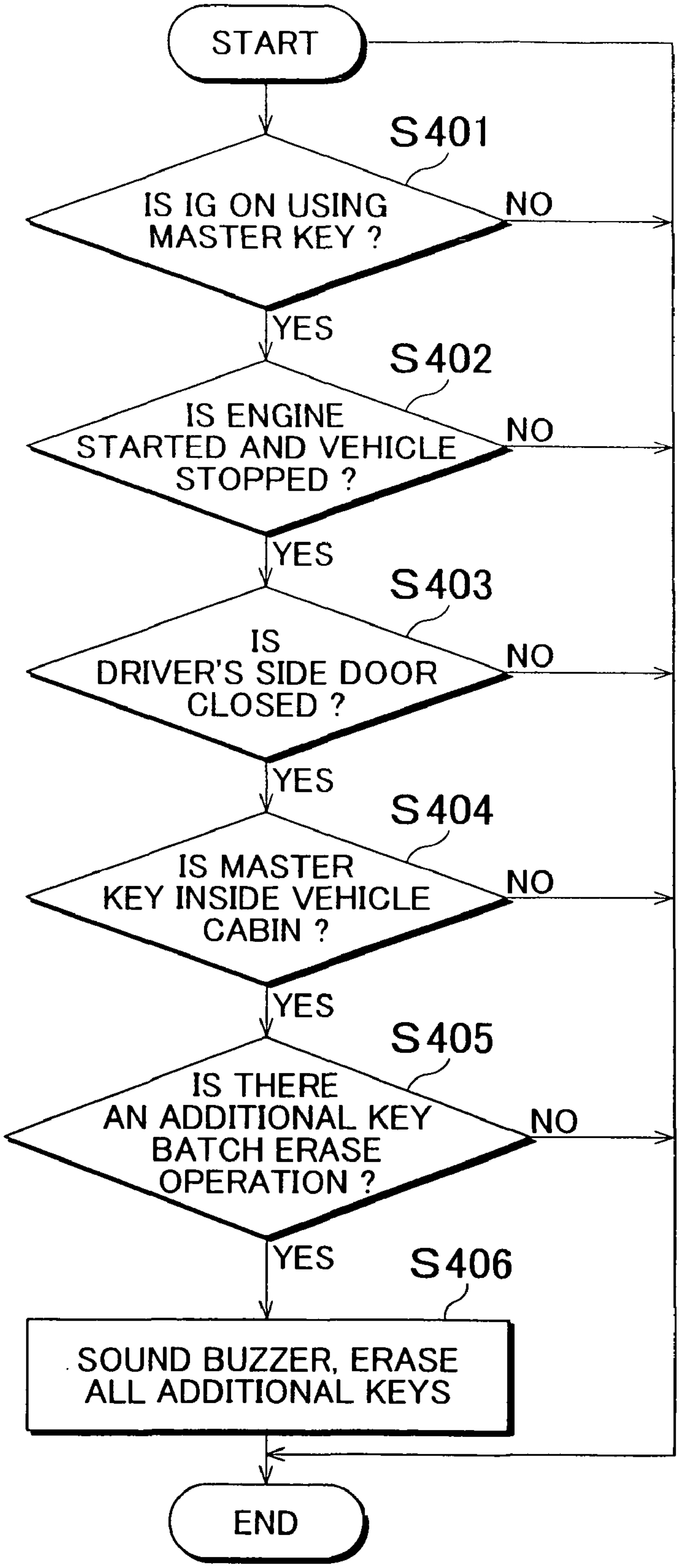
FIG. 4 is a flowchart illustrating the flow of an additional key batch erase routine.

Next, a routine for batch erasing only the key codes of the additional keys will be described with reference to FIG. 4. FIG. 4 is a flowchart illustrating the flow of the additional key batch erase routine executed by the electronic key system 100 according to this example embodiment.

First it is determined whether the IG is turned on by the master key (step S401). If it is detected that the IG is turned on by the master key (i.e., YES in step S401), then it is next determined whether the engine has been started and the vehicle remains stopped (step S402). Here, the vehicle is determined to be stopped when, for example, any one, or a combination of two or more, of the following has been detected: i) the vehicle speed is zero, ii) the parking brake is on, iii) the shift lever is in the P position.

If the engine has been started and the vehicle is stopped (i.e., YES in step S402), it is next determined whether the driver's side door has changed from being open to closed in order to determine whether the driver has gotten into the vehicle cabin (step S403).

If the driver's side door has changed from being open to closed (i.e., YES in step S403), it is then determined whether the master key is in the vehicle cabin (step S404) by performing master key in-vehicle detection.

If the master key is in the vehicle cabin (i.e., YES in step S404), it is next determined whether a predetermined additional key batch erase operation has been performed by the driver (step S405). In this case, the predetermined additional key batch erase operation may be any operation as long as it serves to transmit the intention of the driver to erase all of the additional keys that are registered to the onboard apparatus 101. For example, when the electronic key 102 has a wireless lock button, the additional key batch erase operation may be an operation of pushing the wireless lock button of the master key and holding in that state for a predetermined period of time or longer.

If the predetermined additional key batch erase operation has been performed by the driver (i.e., YES in step S405), the control portion 108 then controls the buzzer device 109 to sound a buzzer in a predetermined pattern and erases all of the key codes of additional keys that are stored in the storage portion 106 based on the property codes.

If, on the other hand, one or more of the conditions in steps S401 to S405 are not satisfied (i.e., NO in any of steps S401 to S405), the additional key batch erase step will not be performed.

In this way, if a user that has purchased a used vehicle, for example, is made aware of the fact that there are additional keys that he or she has not received from the previous user through, for example, the additional key check and notification routine described above, the user can then erase the key codes of those additional keys, thus invalidating them, by the additional key batch erase routine described above.

As is evident to one skilled in the art, it is also possible to erase only the key code of a specific additional key, from among the additional keys that are registered, by also taking into account the ID code in addition to the property code.

In this way, according to the example embodiment, because the property code which indicates whether an electronic key is the master key or an additional key is included in the key code of that electronic key, it is possible to erase only the key code of an additional key, from among the key codes registered with the vehicle, based on this property code.

Also according to the example embodiment, the user is notified if there are any additional keys that are registered when the onboard apparatus is started again after being reset. As a result, the user is easily able to tell if there are any additional keys.

While the invention has been described with reference to exemplary embodiments thereof, it is to be understood that they are merely examples and the invention is not limited to those exemplary embodiments. For example, as described above, houses are now appearing which employ electronic key systems in front doors. Accordingly, the invention can also be applied to an electronic key system employed for use other than in a vehicle, such as in this kind of house or the like.

In addition, as is evident to one skilled in the art, the electronic key system according to the invention can of course be employed in both a vehicle and a house, such that the electronic keys for both are incorporated into a single common key.

As described above, the invention can be used in various types of electronic key systems used in vehicles and houses and the like, for example.

What is claimed is:

1. An electronic key system comprising:

an authentication portion which checks, using two-way communication, a key code stored in an electronic key against a key code stored in a lock device that locks an entrance to a predetermined space; and a controller which allows an unlocking operation of the lock device when, according to the authentication portion, the key code stored in the electronic key matches the key code stored in the lock device, wherein the key code includes an identification code unique to the electronic key and a property code indicative of a property of the electronic key, wherein the property code is a code which alone indicates whether the electronic key is a master key that was registered in advance at the time of shipping and whether the electronic key is an additional key that was newly registered after shipping, wherein the lock device erases at least one key code that includes a predetermined property code, from among the key codes stored in the lock device, when a predetermined operation is performed, and wherein the lock device erases only key codes that include a property code indicating that the electronic key is an additional key from among the key codes stored in the lock device.

2. The electronic key system according to claim 1, wherein the unlocking operation is allowed when the identification code and the property code stored in the electronic key match the identification code and the property code, respectively, stored in the lock device.

3. The electronic key system according to claim 1, wherein the predetermined operation includes an operation using the master key.

4. The electronic key system according to claim 1, wherein the predetermined property code is a code indicating that the electronic key is an additional key that was newly registered after shipping.

5. The electronic key system according to claim 1, wherein the lock device includes a notifying device that checks whether a key code that includes a predetermined property code is stored in the lock device and notifies a user when the key code that includes the predetermined property code is stored in the lock device.

6. The electronic key system according to claim 5, wherein when the lock device is reset, the lock device checks whether the key code that includes the predetermined property code is stored in the lock device.

7. The electronic key system according to claim 5, wherein the notifying device includes at least one of a buzzer device and a display unit, and notifies the user by sounding a buzzer with the buzzer device or displaying textual information on the display unit.

8. An electronic key system comprising:

an authentication portion which checks, using two-way communication, a key code stored in an electronic key against a key code stored in an onboard apparatus mounted in a vehicle; and a controller that performs or allows a predetermined vehicle operation, when according to the authentication portion, the key code stored in the electronic key matches the key code stored in the onboard apparatus, wherein the key code includes an identification code unique to the electronic key and a property code indicative of a property of the electronic key, wherein the property code is a code that alone indicates whether the electronic key is a master key that was registered in advance at the time of shipping and whether the electronic key is an additional key that was newly registered after shipping, wherein the onboard apparatus erases at least one key code that includes a predetermined property code, from among the key codes stored in the onboard apparatus, when a predetermined operation is performed, and wherein the onboard apparatus erases only key codes that include a property code indicating that the electronic key is an additional key from among the key codes stored in the onboard apparatus.

9. The electronic key system according to claim 8, wherein the vehicle operation is allowed when the identification code and the property code stored in the electronic key match the identification code and the property code, respectively, stored in the onboard apparatus.

10. The electronic key system according to claim 8, wherein the predetermined operation includes an operation using the master key.

11. The electronic key system according to claim 8, wherein the predetermined property code is a code indicating that the electronic key is an additional key that was newly registered after shipping.

12. The electronic key system according to claim 8, wherein the onboard apparatus includes a notifying device that checks whether a key code that includes a predetermined property code is stored in the onboard apparatus and notifies a user when the key code that includes the predetermined property code is stored in the onboard apparatus when the onboard apparatus is started up.

13. The electronic key system according to claim 12, wherein when the onboard apparatus is reset, the onboard apparatus checks whether the key code that includes the predetermined property code is stored in the onboard apparatus.

14. The electronic key system according to claim 12, wherein the notifying device includes at least one of a buzzer device and a display unit, and notifies the user by sounding a buzzer with the buzzer device or displaying textual information on the display unit.

15. An electronic key system comprising:

an authentication portion which checks, using two-way communication, a key code stored in an electronic key against a key code stored in a lock device that locks an entrance to a predetermined space;

a controller which allows an unlocking operation of the lock device when, according to the authentication portion, the key code stored in the electronic key matches the key code stored in the lock device, wherein the key code includes an identification code unique to the electronic key and a property code indicative of a property of the electronic key, wherein the property code is a code which alone indicates whether the electronic key is a master key that was registered in advance at the time of shipping and whether the electronic key is an additional key that was newly registered after shipping, and wherein the lock device erases at least one key code that includes a predetermined property code, from among the key codes stored in the lock device, when a predetermined operation is performed; and a storage that stores the property code for each key code such that the lock device erases at least one key code that includes the predetermined property code based on comparing the property code for the at least one key code stored in the storage with the predetermined property code.

16. An electronic key system comprising:

an authentication portion which checks, using two-way communication, a key code stored in an electronic key against a key code stored in an onboard apparatus mounted in a vehicle;

a controller that performs or allows a predetermined vehicle operation, when according to the authentication portion, the key code stored in the electronic key matches the key code stored in the onboard apparatus, wherein the key code includes an identification code unique to the electronic key and a property code indicative of a property of the electronic key, wherein the property code is a code that alone indicates whether the electronic key is a master key that was registered in advance at the time of shipping and whether the electronic key is an additional key that was newly registered after shipping, and wherein the onboard apparatus erases at least one key code that includes a predetermined property code, from among the key codes stored in the onboard apparatus, when a predetermined operation is performed; and a storage that stores the property code for each key code such that the onboard apparatus erases at least one key code that includes the predetermined property code based on comparing the property code for the at least one key code stored in the storage with the predetermined property code.

* * * * *